United States Patent
Yamamura et al.

(10) Patent No.: US 6,220,057 B1
(45) Date of Patent: Apr. 24, 2001

(54) APPARATUS AND METHOD FOR DRAWING A GLASS INGOT

(75) Inventors: Waichi Yamamura; Tadakatsu Shimada; Hideo Hirasawa, all of Annaka; Soichiro Kemmochi, Tokyo, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/087,663

(22) Filed: Jun. 1, 1998

(30) Foreign Application Priority Data

May 30, 1997 (JP) .................................................. 9-141892

(51) Int. Cl.⁷ .................................................. C03B 37/07
(52) U.S. Cl. .................................. 65/382; 65/384; 65/491
(58) Field of Search .............................. 65/381, 382, 384, 65/29.1, 29.14, 435, 485, 486, 488, 491 533, 537

(56) References Cited

U.S. PATENT DOCUMENTS

| | | | | |
|---|---|---|---|---|
| 4,101,300 | * | 7/1978 | Imoto et al. | 65/382 |
| 4,102,661 | * | 7/1978 | Dudderar et al. | 65/378 |
| 4,317,666 | * | 3/1982 | Faure et al. | 65/381 |
| 4,523,938 | * | 6/1985 | Grego | 65/382 |
| 5,051,121 | * | 9/1991 | Grundy | 65/384 |
| 5,073,179 | * | 12/1991 | Yoshimura et al. | 65/382 |
| 5,314,517 | * | 5/1994 | Koening et al. | 427/163.1 |
| 5,693,115 | * | 12/1997 | Ito et al. | 65/384 |
| 5,755,849 | * | 5/1998 | Hoshino et al. | 65/381 |

FOREIGN PATENT DOCUMENTS

| | | | |
|---|---|---|---|
| 57-92534 | * | 6/1982 | (JP) . |
| 57-092534 | | 6/1982 | (JP) . |
| 61-14149 | * | 1/1986 | (JP) . |
| 61-014149 | | 1/1986 | (JP) . |
| 63-30337 | * | 2/1988 | (JP) . |
| 63-030337 | | 2/1988 | (JP) . |
| 63-195139 | * | 8/1988 | (JP) . |
| 04083726 | | 3/1992 | (JP) . |
| 4-83726 | * | 3/1992 | (JP) . |
| 08059274 | | 3/1996 | (JP) . |

* cited by examiner

Primary Examiner—Sean Vincent
(74) Attorney, Agent, or Firm—McDermott, Will & Emery

(57) ABSTRACT

A method for drawing a glass ingot comprises holding a vertically suspended glass ingot 5 at an upper end thereof, passing the ingot through a heating furnace 10 having upper and lower openings, and drawing the glass ingot while moving one end or both ends thereof, wherein a plurality of heating means 1 are provided along vertical directions in the heating furnace 10, and the temperatures of the respective heating means 1 are individually control to control a temperature distribution within the heating furnace 10.

5 Claims, 5 Drawing Sheets

APPARATUS AND METHOD FOR DRAWING A GLASS INGOT

BACKGROUND OF THE INVENTION

1. Field of the Invention

This invention relates to a method for drawing a glass ingot wherein the glass ingot is drawn to a predetermined outer diameter to obtain a glass rod or preform for an optical fiber having the predetermined outer diameter.

2. Description of the Prior Art

For the drawing of a large-sized glass ingot having a diameter exceeding 100 mm, there is known a method wherein the ingot is heated and softened in an electric furnace, under which it is applied with a given tension thereto.

Such a large-sized ingot has, as shown in FIG. 3, a tapered portion or stepped portion 4 which is formed at opposite sides thereof during the course of its fabrication.

FIG. 5 is a conventional apparatus of drawing a glass rod. For the drawing of such a large-sized ingot 25, dummy shafts provided at opposite sides of the ingot are held so that the ingot is set in the drawing apparatus and is drawn into a glass rod 36.

As an ingot increases in size and diameter, it becomes necessary to further increase the diameter of the heater and a heating zone in the heating furnace.

Where such a large-sized heater is used and an large-sized glass ingot having a tapered portion whose diameter changes in vertical directions is drawn, not only a region of the ingot to be softened and deformed, but also the tapered portion with a smaller diameter is heated and starts to be softened and drawn. Accordingly, the resultant rod cannot have a given diameter throughout its length. As is particularly shown in FIG. 6, there arises the problem that the diameter greatly changes particularly at completion of the drawing.

In this case, there is a further problem that the drawn glass rod should be subjected to finishing drawing by use of a glass-working lathe in order to meet standards for a diameter of the drawn rod, coupled with another problem that the greater change in the diameter results in a longer finishing time.

SUMMARY OF THE INVENTION

It is therefore an object of the invention to provide a method for drawing a glass ingot which overcomes the problems of the prior art methods, and wherein when a large-sized ingot is drawn, the controllability in the diameter of a drawn rod is so improved that the resultant rod has a given diameter even from the tapered portions whose shape abruptly changes.

The method for drawing a glass ingot according to the invention comprises holding a vertically suspended glass ingot at its upper end, and passing the glass ingot through a heating furnace having upper and lower openings under which the glass ingot is drawn while moving one or both ends of the glass ingot, characterized in that a plurality of heating means are provided in the heating furnace along vertical directions, and are individually controlled in temperature to control a temperature distribution within the heating furnace.

According to the invention, a rod with a given diameter can be obtained upon drawing of a tapered portion, in which the diameter of an ingot abruptly changes. This is advantageous in that any correction of the rod diameter in a subsequent step using a glass-working lathe is unnecessary, thereby ensuring low fabrication costs.

BRIEF DESCRIPTION OF THE DRAWINGS

In the drawings, indicated by reference numerals $1a$, $1b$, $1c$, 21 are, respectively, a heating means, by 2, 22 are, respectively, dummy shafts, by 3, 23 are, respectively, dummy rods, by 4, 24 are, respectively, tapered portions, by 5, 25 are, respectively, ingots, by $5a$ is a body portion, and by $6a$, $6b$ and 26 are, respectively, outer diameter measuring devices. Likewise, indicated by 7, 27 are, respectively, insulating materials, by 8, 28 are, respectively, takeoff rolls, by 9, 29 are, respectively, work-feeding chucks, by 10, 20 are, respectively, heating furnaces, by 11, 31 are, respectively, heat barrier covers, by 12, 32 are, respectively, operation control units, by 13, 33 are, respectively, power supplies for heaters, by 34 is a programmed temperature controller, by 15, 35 are, respectively, motors, and by 16, 36 are, respectively, rods. In FIG. 3, $L_1$ and $L_2$, respectively, indicate a tapered portion, and Ls indicates a body portion.

EMBODIMENTS OF THE INVENTION

Figure 1:
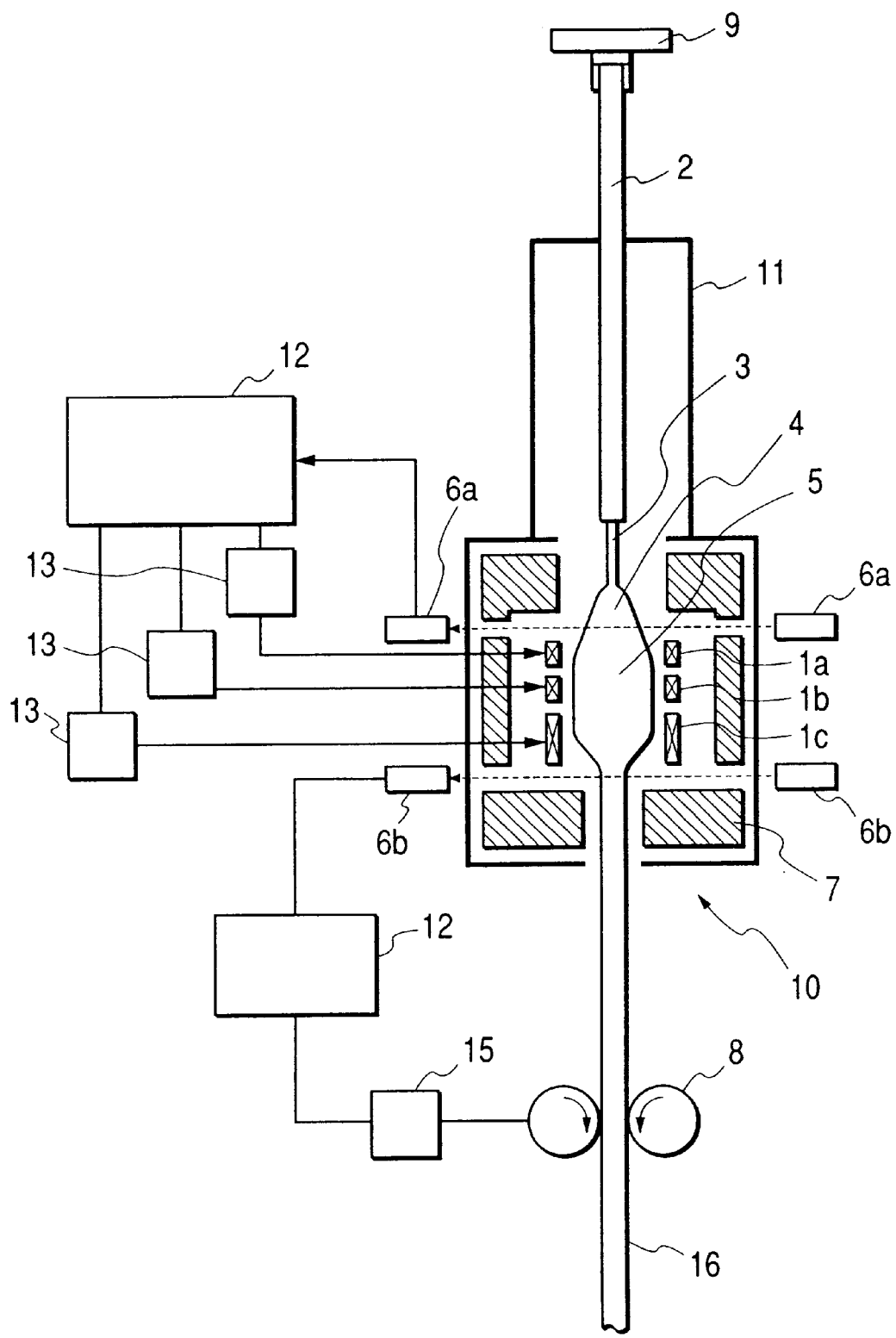
FIG. 1 is a schematic view showing a drawing apparatus of a glass ingot used in the present invention.

FIG. 1 shows an apparatus of drawing a glass ingot used in the present invention, in which a glass ingot 5 is fixedly inserted into a dummy shaft 2 at one end thereof (i.e. a feeding end), and is held with a work feed chuck 9. The ingot is moved and passed into a heating furnace 10, and is taken off at the other end thereof by means of take-off rollers 8 and is thus drawn into a rod 16.

Figure 2A:
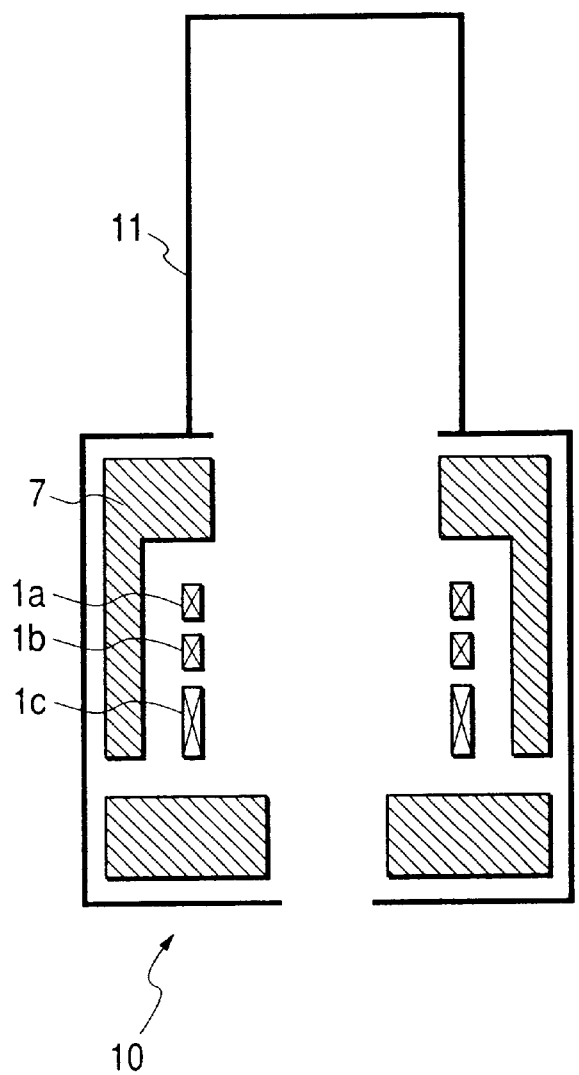
FIGS. 2a and 2b are, respectively, views showing a heating furnace of the drawing device of a glass ingot used in the invention and a temperature distribution within the heating furnace.
Figure 2B:
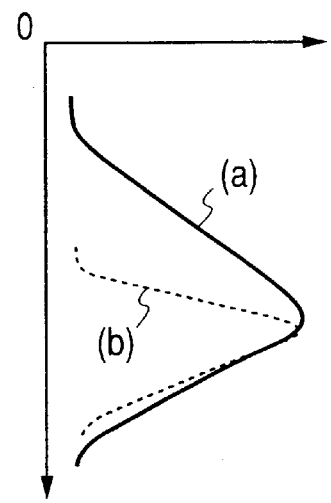

As shown in FIG. 2a, the heating furnace is provided with a plurality of heating means $1a$, $1b$ and $1c$ along vertical directions, and the temperatures of the heating means are individually controlled to control a temperature distribution within the heating furnace as shown in (a) or (b) in FIG. 2b.

Outer diameter measuring devices $6a$, $6b$ are, respectively, provided above and below the heating means.

The control of the diameter of the drawn rod is performed such that the speed of the ingot being fed to the heating furnace and the take-off speed of the drawn rod are relatively changed based on the signals from the outer diameter measuring device $6b$.

At the time, the values of the outer diameter measuring device $6b$ are sequentially monitored, under which when the body portion of the ingot is drawn, the heating means $1a$ to $1c$ are so controlled that temperature distribution in the furnace is in the state of (a) in FIG. 2b. On the other hand, when the tapered portion of the ingot is drawn in case where a variation of a measurement of the outer diameter measuring device $6a$ exceeds a preset value, the heaters of the heating means 1a to 1c are controlled in their output power so that the temperature distribution is in the state shown in (b) of FIG. 2b.

Moreover, the profile of the ingot to be drawn has been preliminarily measured, and the position of the body of the ingot and the position of the tapered portion, at which the diameter of the ingot greatly changes, are calculated from the profile data. At the time when the ingot arrives at the position of the tapered portion from the body on the basis of the value of the outer diameter measuring device 6a, the output power applied to each of the heating means 1a to 1c from the heater power supplies is appropriately controlled to change the temperature distribution to the state shown in (b) of FIG. 2b.

The invention is more particularly described by way of examples.

EXAMPLE 1

Figure 3:
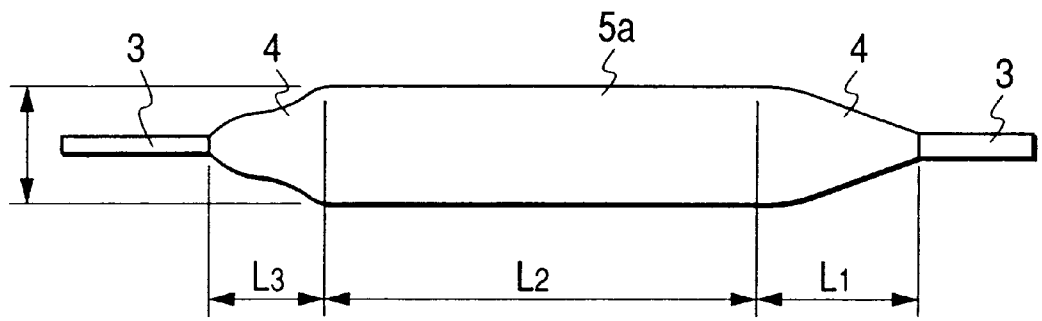
FIG. 3 is a schematic view showing a glass ingot.

An ingot shown in FIG. 3, which had an outer diameter of 140 mm and a length of 2100 mm, with tapered portions having a length of $L_1$=450 mm, a length of $L_3$=450 mm, and a body length of $L_2$=1200 mm, was drawn into a rod with an outer diameter of 50 mm. A heating furnace had a heating means 1a, a heating means 1b, and a heating means 1c arranged vertically. When the body of the ingot was drawn, the temperature distribution within the furnace was so controlled as to be in the state of (a) shown in FIG. 2b by means of the heating means 1a to 1c. On the other hand, when a tapered portion, which was a final portion of the ingot, was drawn, the output power to the heating means was so controlled by means of the operation control unit as to be gradually reduced, thereby establishing a temperature distribution in a state shown as (b) in FIG. 2b.

Figure 4:
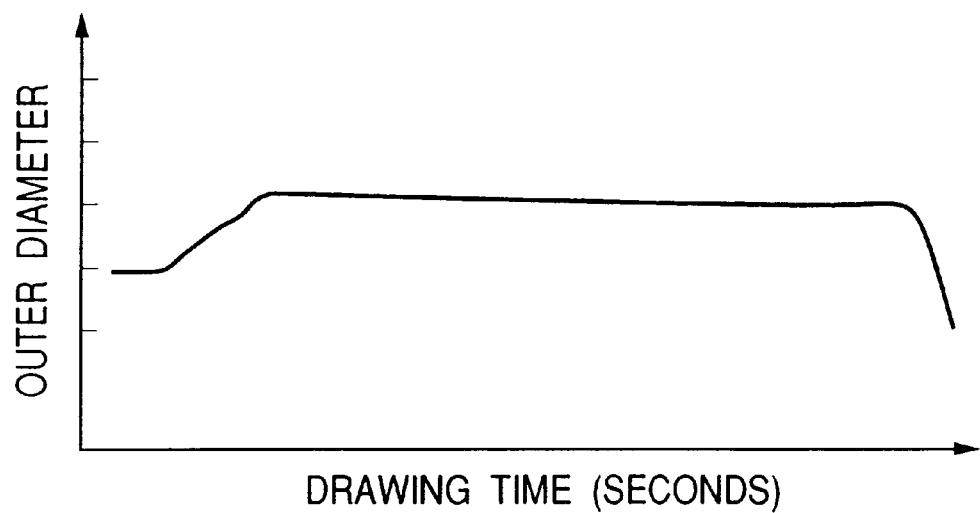
FIG. 4 is a graph showing the variation in outer diameter in relation to the variation in the drawing time of a glass rod obtained in the present invention.

As a result, the diameter of the rod drawn from the final tapered portion of the ingot had little variation in diameter at 50 mm±0.5 mm. Thus, the variation was very small as shown in FIG. 4.

EXAMPLE 2

In Example 1, an ingot of the type shown in FIG. 3 and having an outer diameter of 140 mm and a length of 2100 mm was subjected to measurement of lengths, $L_1$ and $L_3$, of the tapered portions and a length, $L_2$, of the body. Thereafter, the ingot was attached to a work feed chuck of a drawing device in such a way that the tapered portion was turned upward (or turned toward the side of completion of drawing). The output power applied to each of heating means 1a to 1c from power supplies was controlled based on the preliminarily measured lengths, $L_1$ and $L_3$, of the tapered portions and length, $L_2$, of the body, and a movement of the work feed chuck. The ingot was drown so that the temperature distribution within the furnace was in the state (a) in FIG. 2b at the ingot body, whereas the temperature distribution was in the state (b) in FIG. 2b at the tapered portion.

As a result, it was found that the diameter of the rod drawn from the final tapered portion of the ingot had little variation in diameter at 50 mm±0.6 mm. Thus, the variation was very small as shown in FIG. 4.

COMPARATIVE EXAMPLE

Figure 5:
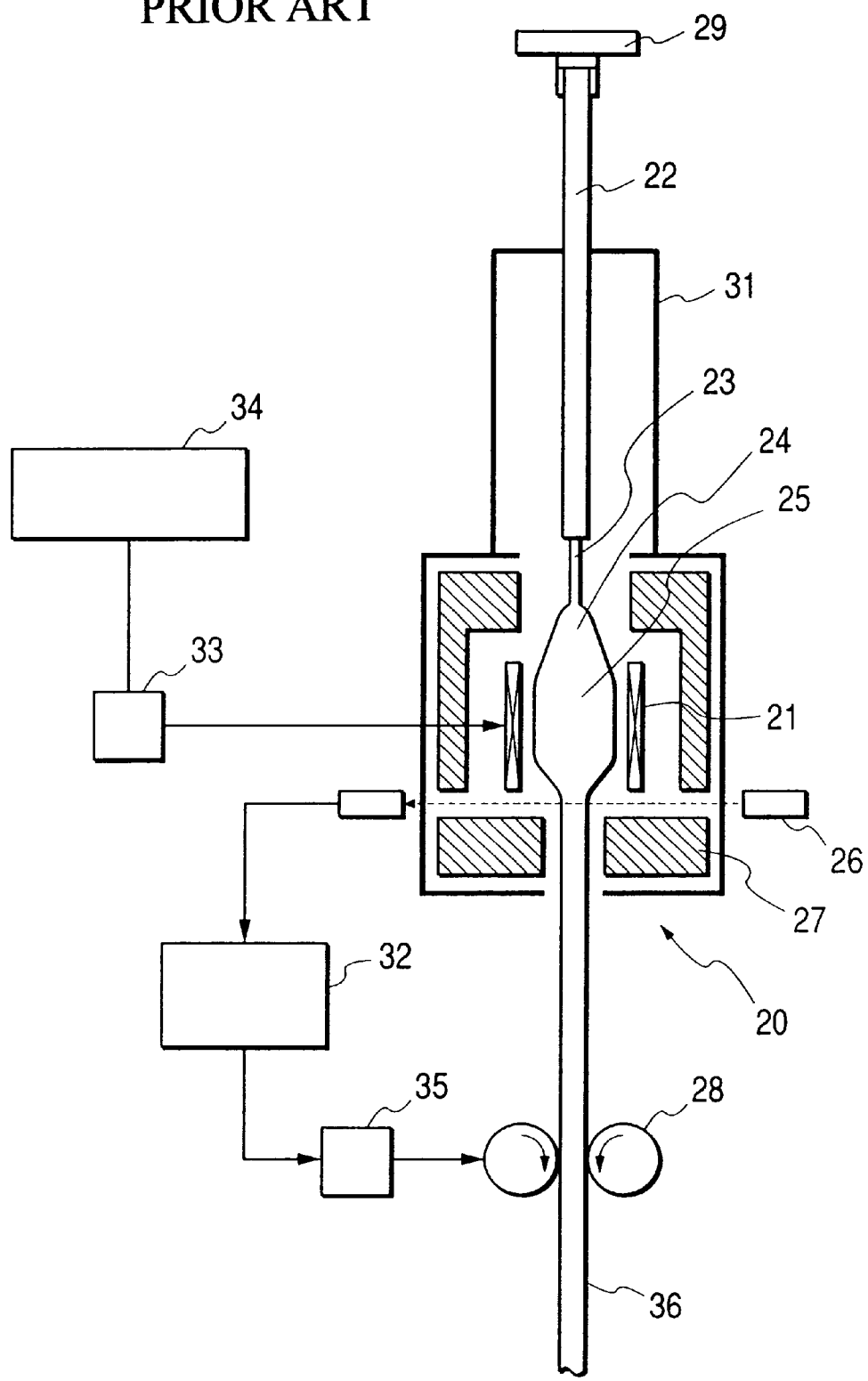
FIG. 5 is a schematic view showing a drawing apparatus of a glass ingot used in a prior art method.

An ingot of the type shown in FIG. 3 and having an outer diameter of 140 mm and a length of 2100 mm with lengths $L_1$=450 mm and $L_3$=450 of the tapered portions and a length $L_3$=1200 of the body, was placed in a conventional drawing apparatus shown in FIG. 5 and having no operation control unit for controlling heating means. The tapered portion was turned upward (or turned at the side of completion of drawing) and attached to a work feed chuck, followed by drawing into a rod with an outer diameter of 50 mm under the same conditions as in Example 1.

At the time when the body of the ingot was drawn, the temperature distribution within the furnace was just as (a) in FIG. 2b. At the final stage of the drawing, the temperature distribution was substantially the same as the above one although the temperature in the furnace was slightly lower than that experienced for the drawing of the body.

Figure 6:
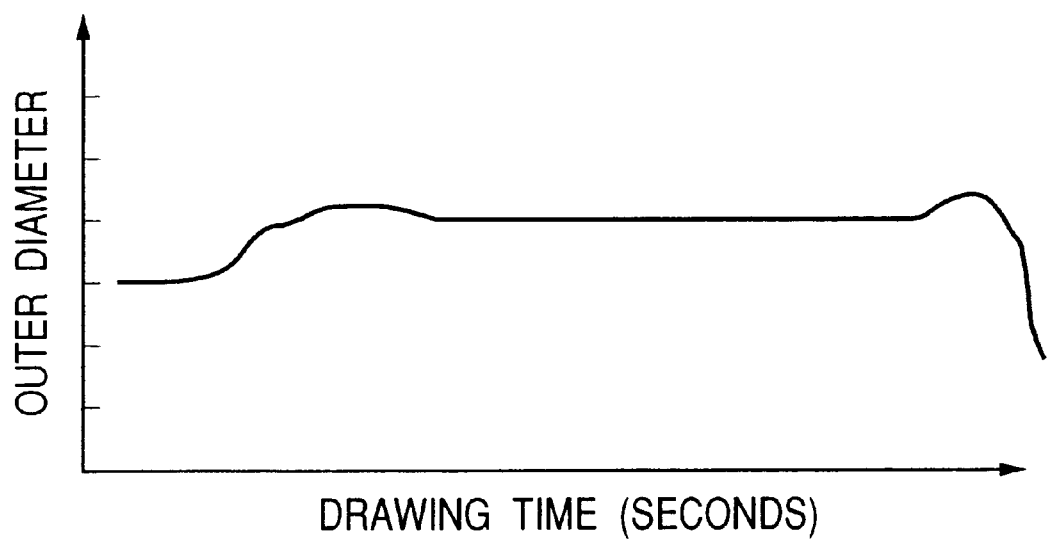
FIG. 6 is a graph showing the variation in outer diameter in relation to the variation in the drawing time of a glass rod obtained by the prior art method.

As a result, the diameter of the rod drawn from the final tapered portion of the ingot greatly varied and ranged from 50 mm−2 mm to 50 mm+10 mm (i.e. 48 mm to 60 mm). Thus, the variation in the diameter was very great at the time of completion of the drawing as shown in FIG. 6.

According to the invention, a rod having a given diameter can be obtained from a tapered portion wherein the diameter of the ingot abruptly changes. Accordingly, any correction of a rod diameter, which has been made in a subsequent step using a glass-working lathe, becomes unnecessary, resulting in the reduction of costs.

We claim:

1. A method for drawing a glass ingot comprising the steps of:

holding a vertically suspended glass ingot at an upper end thereof;

passing said glass ingot through a heating furnace having a plurality of heaters along vertical directions;

controlling the temperature distribution within the heating furnace by individually controlling the output of each of said plurality of heaters; and drawing said glass ingot while moving one or both ends of said glass ingot.

2. The method for drawing a glass ingot according to claim 1, wherein said controlling step further includes the step of measuring the outer diameter of said glass ingot to obtain profile data of said glass ingot and using said profile data in said controlling step to individually control the output of each of said plurality of heaters.

3. The method for drawing a glass ingot according to claim 1, wherein said controlling step further includes the step of preliminarily measuring said glass ingot to obtain profile data of said glass ingot and using said profile data to control the output of each of said plurality of heaters.

4. An apparatus for drawing a glass ingot comprising:

a heating furnace having an upper opening and a lower opening;

a means for passing said glass ingot through said upper opening of said furnace;

a plurality of heaters within said furnace, a control means for controlling the individual output of each of said plurality of heaters to control temperature distribution in said furnace; and a means for drawing said glass ingot from said lower opening of said furnace.

5. The apparatus for drawing a glass ingot according to claim 4, wherein said apparatus includes an outer diameter measuring device located above said plurality of heaters to measure the profile of the glass ingot to obtain profile data which data is used to control the output of each of said plurality of heaters.

* * * * *